(12) United States Patent
Vali Daei Nooshabadi

(10) Patent No.: US 9,506,510 B2
(45) Date of Patent: Nov. 29, 2016

(54) BRAKING SYSTEM FOR VEHICLES WITH HIGH BRAKE EFFICIENCY

(71) Applicant: Ali Vali Daei Nooshabadi, Kerman (IR)

(72) Inventor: Ali Vali Daei Nooshabadi, Kerman (IR)

( * ) Notice: Subject to any disclaimer, the term of this patent is extended or adjusted under 35 U.S.C. 154(b) by 0 days.

(21) Appl. No.: 14/867,007

(22) Filed: Sep. 28, 2015

(65) Prior Publication Data

US 2016/0017941 A1    Jan. 21, 2016

(51) Int. Cl.
| | |
|---|---|
| *B60K 25/10* | (2006.01) |
| *F16D 55/225* | (2006.01) |
| *F16D 67/02* | (2006.01) |
| *F16D 55/226* | (2006.01) |
| *F16D 55/228* | (2006.01) |
| *F16D 121/02* | (2012.01) |
| *F16D 125/10* | (2012.01) |

(52) U.S. Cl.
CPC .......... *F16D 55/225* (2013.01); *F16D 55/226* (2013.01); *F16D 55/228* (2013.01); *F16D 67/02* (2013.01); *F16D 2121/02* (2013.01); *F16D 2125/10* (2013.01)

(58) Field of Classification Search
CPC ...... F16D 48/06; F16D 55/225; F16D 67/02; G05B 11/32; G06F 17/00; B60K 6/12; B60K 6/105
USPC ..... 180/54.1, 165; 192/12 R, 215, 221, 225; 188/74, 141, 151 R, 152, 78, 129, 134
See application file for complete search history.

(56) References Cited

U.S. PATENT DOCUMENTS

| | | | | |
|---|---|---|---|---|
| 3,734,222 | A * | 5/1973 | Bardwick, III | B60K 6/105 180/165 |
| 4,252,208 | A * | 2/1981 | Heidemeyer | B60K 6/105 180/165 |
| 4,351,409 | A * | 9/1982 | Malik | B60K 6/12 180/165 |
| 4,443,155 | A * | 4/1984 | Smith | F03D 7/0248 416/133 |
| 4,495,836 | A * | 1/1985 | Cohen | B60K 6/105 180/165 |
| 4,499,965 | A * | 2/1985 | Oetting | B60K 6/105 180/165 |
| 5,804,935 | A * | 9/1998 | Radev | B60K 17/356 180/65.7 |
| 2015/0054285 | A1 * | 2/2015 | Hobdy | F03B 13/20 290/53 |

* cited by examiner

*Primary Examiner* — Christopher Schwartz
(74) *Attorney, Agent, or Firm* — Barry Choobin; Patent 360

(57) ABSTRACT

The embodiments herein disclose a braking system with high brake efficiency comprises a retainer main shaft, a retainer chassis, a brake assembly, a turbine assembly, a locker assembly and a buffer. The retainer main shaft is shaft provided in the vehicle for power transfer from the engine onto the wheels. The retainer chassis is perpendicularly connected to the retainer main shaft and provides a rigid support to the retainer main shaft. The brake assembly is connected to the retainer main shaft through a plurality of ball bearings. The turbine assembly is mounted over the brake assembly. The locker assembly is connected to the brake assembly through a plurality of cams. The locker assembly is further connected to the turbine assembly through a locker base. The buffer is connected between the brake assembly and the turbine assembly to redistribute an excess pressure exerted on the turbine assembly.

8 Claims, 5 Drawing Sheets

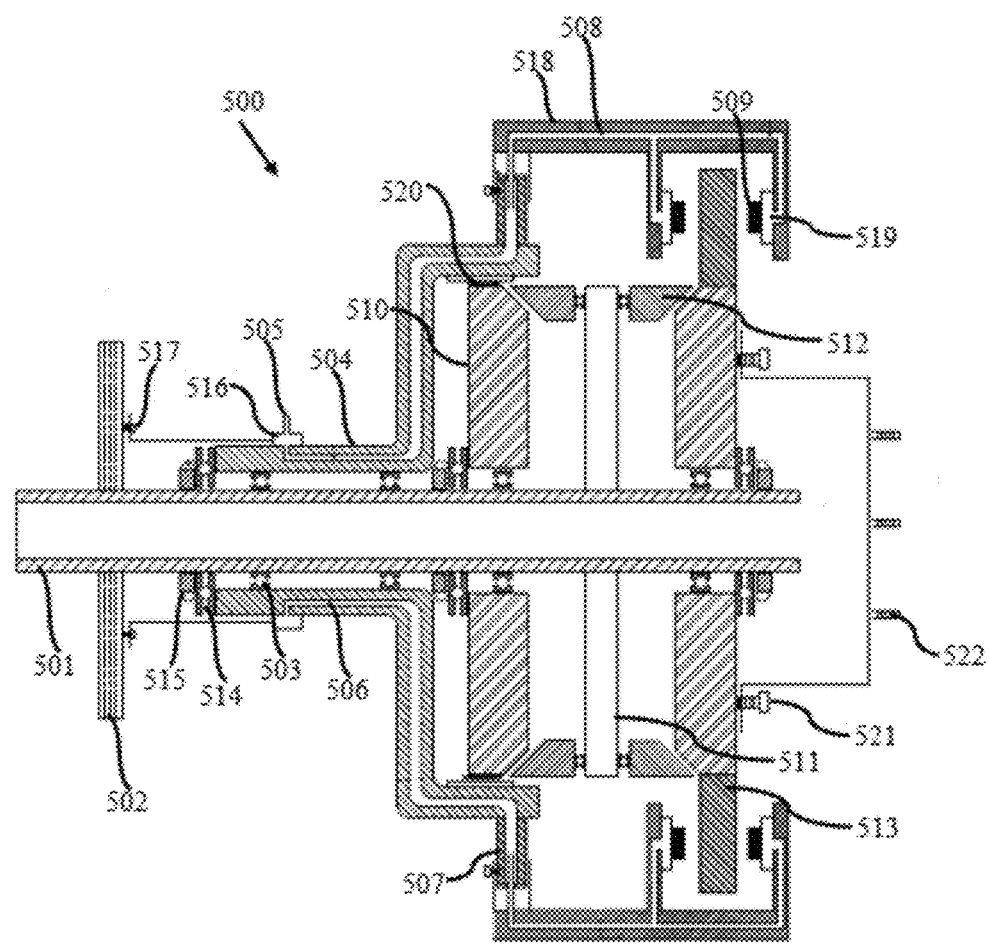
FIG. 5A
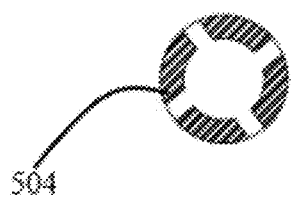 
FIG. 5B FIG. 5C

BRAKING SYSTEM FOR VEHICLES WITH HIGH BRAKE EFFICIENCY

BACKGROUND

Technical Field of Invention

The embodiments herein generally relate to an automobile system and particularly relate to a braking system for the vehicles. The embodiments herein more particularly relate to a braking system to produce higher efficiency during a conversion of a brake force into heat on application of brakes of the vehicle.

Description of Related Art

A brake is a mechanical device which inhibits a motion, or slows or stops a moving object or prevents its motion. Most commonly, the brakes use a friction between two surfaces pressed together to convert the kinetic energy of the moving object into heat, though other methods of energy conversion may also be employed. For example, a regenerative braking converts a frictional energy to electrical energy, which may be stored for later use. Further, an eddy current brakes uses varying magnetic fields to convert kinetic energy in the brake disc, fin, or rail, into electrical energy. Still, there are other braking methods which transform kinetic energy into different energy forms, for example transferring the kinetic energy to a rotating flywheel.

One of the prior arts discloses a mechanical anti-lock braking apparatus for intermittently releasing of pressure applied by a brake shoe to a wheel being braked. The apparatus includes a control member, a power input for causing the control member to rotate with the wheel around a rotational axis, and a control input for changing the position of the control member relative to a follower connected to the calipers or brackets to which the brake shoe is mounted. The control member and/or the follower has a shape which causes the follower to oscillate as the control member rotates, with the relative position of the control member and follower determining the magnitude of the oscillations.

Another prior art discloses a mechanical brake system for decelerating or ending the rotation of a wheel of a vehicle, adapted to eliminate the friction of the brakes with said decelerated wheel in a manner that the braking force is lower than the torque force of said wheel so that the locking of the wheel is prevented and the vehicle skid is eliminated. Moreover, a method of preventing a vehicle from skidding and/or for avoiding said vehicle's wheel from locking comprising applying the aforesaid braking system is also disclosed.

However, in one brake system with a fixed lining, a disc moves on a brake lining to convert energy into heat generation. In the prior art braking systems, the whole vehicle moves by disc of the brake lining resulting in coverage of longer distance by the vehicle to stop effectively.

In the view of the foregoing, there is a need for an effective braking system to stop the vehicle instantaneously and locking the brakes.

The above mentioned shortcomings, disadvantages and problems are addressed herein, as detailed below.

SUMMARY OF THE INVENTION

The primary object of the embodiments herein is to provide a braking system with a movement of the brake lining in reverse direction of a wheel movement to efficiently convert a kinetic energy into optimum heat and thus stopping the vehicle instantaneously.

Another object of the embodiments herein is to provide a braking system with a locking mechanism during a reverse movement of the brake linings with respect to the wheel of the vehicle to disallow a movement of the brake linings with the brake disc.

Yet another object of the embodiments herein is to provide a braking system to use an independent energy such as stored compressed energy for rotating the brake linings in reverse direction of a brake disk movement.

The various embodiments herein disclose a braking system with high brake efficiency comprising a retainer main shaft, a retainer chassis, a brake assembly, a turbine assembly, a locker assembly and a buffer. The retainer main shaft is shaft provided in the vehicle for power transfer from the engine onto the wheels. The retainer chassis is perpendicularly connected to the retainer main shaft and provides a rigid support to the retainer main shaft. The brake assembly is connected to the retainer main shaft through a plurality of ball bearings. The turbine assembly is mounted over the brake assembly. The locker assembly is connected to the brake assembly through a plurality of cams. The locker assembly is further connected to the turbine assembly through a locker base. The buffer is connected between the brake assembly and the turbine assembly to avoid and redistribute an excess pressure exerted on the turbine assembly due to a movement of the rotating shaft. The buffer performs a clutching function between the brake assembly and the turbine assembly.

According to one embodiment herein, the brake assembly comprises a rotating shaft, a brake fluid inlet, a frame, a brake fluid transmitter tube, a brake fluid transmit cylinder, an oil seal, a brake fluid canal, a brake cylinder, a brake lining and a wheel installation. The rotating shaft is connected to the brake assembly through the plurality of ball bearings. The rotating shaft is hollow in nature. The hollow portion forms a canal. The brake fluid inlet is connected to the canal in the rotating shaft. The frame conjuncts the brake fluid inlet to the rotating shaft. The brake fluid transmitter tube is inserted into the canal at one end. The brake fluid transmit cylinder forms a housing around a transfer junction formed by insertion of the brake fluid transmitter tube into the canal. The oil seal is connected to an end of the brake fluid transmit cylinder. The brake fluid transmit cylinder and the oil seal prevents an oil leakage during a brake fluid transfer from the canal to the brake fluid transmitter tube. The brake fluid canal is connected to a first end of the brake fluid transmitter tube. The brake cylinder is connected to a second end of the brake fluid transmitter tube. The brake lining is connected to the brake cylinder from one end and to a brake disc from another end. The brake disc is connected to the wheel installation. The brake disc is further housed in the retainer main shaft. The brake lining exerts a force on the brake disc to generate heat for stopping the vehicle. The locker assembly blocks a rotation of the rotating shaft in a direction of the rotation of the brake disc resulting in a high heat generation. The high heat generation results in high braking efficiency and an instantaneous braking effect.

According to one embodiment herein, the brake assembly further comprises a brake fluid cylinder, a brake fluid inlet, a spring, a spring retainer pin, a rotating shaft, a brake lining and a brake disc. The brake fluid cylinder is connected to the retainer chassis though a jogger's bar. The brake fluid cylinder holds the brake fluid. The brake fluid cylinder is further connected to the retainer main shaft through a brake cylinder chassis. The brake fluid inlet is provided over the brake fluid cylinder. The brake fluid inlet allows a brake fluid flow from a master cylinder provided in the vehicle to the brake fluid cylinder. The spring is connected to the turbine assembly through the turbine base. The retainer chassis forms a barrier at a first end of the spring. The spring retainer pin holds the spring to it position by forming a barrier at a second side of the spring. The rotating shaft is connected to the retainer main shaft through a primary ball bearing. The rotating shaft is further connected to the turbine assembly through a secondary ball bearing assembly. The primary ball bearing performs a to and fro motion through a bush provided on the retainer main shaft. The brake lining is connected to the rotating shaft through a lining chassis. The brake disc is connected to the wheel through a wheel installation. The brake fluid cylinder is fixed and the turbine moves to and fro through the secondary ball bearing over the rotating shaft. The jogger's bar of the brake fluid cylinder moves forward during a flow of the brake fluid into the brake fluid cylinder. The jogger's bar pushes the secondary ball bearing resulting in a forward movement of the rotating shaft. The forward movement of the rotating shaft provides a placement of the brake lining over the brake disc to create a friction resulting in a generation of heat. The generation of heat results into an instantaneous braking.

According to one embodiment herein, the brake assembly further comprises a brake fluid cylinder, a brake fluid inlet, a spring, a spring retainer pin, an intermediate shaft, a rotating shaft, a brake lining and a brake disc. The brake fluid cylinder is connected to the retainer chassis though a jogger's bar. The brake fluid cylinder holds the brake fluid. The brake fluid cylinder is further connected to the retainer main shaft through a brake cylinder chassis. The brake fluid inlet is provided over the brake fluid cylinder. The brake fluid inlet allows a brake fluid flow from a master cylinder provided in the vehicle to the brake fluid cylinder. The spring is connected to the turbine assembly through the turbine base. The retainer chassis forms a barrier from a first end of the spring. The spring retainer pin holds the spring to it position by forming a barrier form a second side of the spring. The intermediate shaft is connected fixed over the retainer main shaft through an inner sliding base. The intermediate shaft comprises a vertical bar and a fixed ball bearing. The rotating shaft is connected to the intermediate shaft through the fixed ball bearings. The rotating shaft further holds the turbine assembly. The brake lining is connected to the intermediate shaft through a lining chassis. The brake disc is connected to the wheel through a wheel installation. An outer plate of the retainer shaft slides with the inner sliding base. The jogger's bar of the brake fluid cylinder moves forward during a flow of the brake fluid into the brake fluid cylinder. The jogger's bar pushes the vertical bar resulting in a forward movement of the intermediate shaft and the rotating shaft. The forward movement of the rotating shaft provides a placement of the brake lining over the brake disc to create friction resulting generation of heat. The generation of heat results into an instantaneous braking.

According to one embodiment herein, the turbine assembly comprises a turbine base, a turbine fan and a turbine guard. A first end of the turbine base is attached to the retainer chassis. The turbine fan is connected to a turbine shaft. The turbine shaft is hollow in nature and encompasses the rotating shaft. The turbine guard is connected to a second end of the base. The turbine guard houses the turbine fan and comprises a turbine inlet and a turbine outlet.

According to one embodiment herein, the locker assembly comprises a plurality of locker piston, a coupling valve and an electrical piece. The locker pistons are pushed or released through a movement of the cam. The cam pushes the locker piston in a vertically upward direction to allow a transfer of the brake fluid from one locker cylinder to another locker cylinder. The coupling valve is attached to the locker cylinders. The electrical piece is connected to the coupling valve through an electrical piece shaft. The electrical piece controls an opening or closing of the coupling valve. The electrical piece closes the coupling valve to avoid a fluid transfer resulting in locking a motion of the rotating shaft in a direction of movement of the brake disc.

The embodiments herein disclose a braking system with high brake efficiency comprises a retainer main shaft, a retainer chassis, a brake assembly, a turbine assembly, a locker assembly and a buffer. The retainer main shaft is shaft provided in the vehicle for power transfer from the engine onto the wheels. The retainer chassis is perpendicularly connected to the retainer main shaft and provides a rigid support to the retainer main shaft. The brake assembly is connected to the retainer main shaft through a plurality of ball bearings.

According to one embodiment herein, the brake assembly further comprises a brake fluid cylinder, a brake fluid inlet, a lining rotating disc, a brake lining, a primary ball bearing, a rotating gear, a spring, a second retainer shaft, an intermediate gear, a brake disc and a wheel frame. The brake fluid cylinder is connected to the retainer chassis though a jogger's bar. The brake fluid cylinder holds the brake fluid. The brake fluid cylinder is further connected to the retainer main shaft through a brake cylinder chassis. The brake fluid inlet is provided over the brake fluid cylinder. The brake fluid inlet allows a brake fluid flow from a master cylinder provided in the vehicle to the brake fluid cylinder. The lining rotating disc is mounted on the retainer main shaft through a secondary ball bearing. The lining rotating disc has an inner sliding environment. The secondary ball bearing performs a to and fro motion through a bush placed on an outer environment of the retainer main shaft. The brake lining is installed at one end of the lining rotating disc. The primary ball bearing is mounted on the lining rotating disc in a sliding form and performs a to and fro motion through a bush provided on the lining rotating chassis. The rotating gear is provided on the retainer main shaft. The rotating gear has a sliding outer environment. The spring is connected between the lining rotating disc and the rotating gear. The second retainer shaft is connected to the retainer main shaft. The intermediate gear is installed over the second retainer shaft. The brake disc is attached axially adjacent to the retained main shaft. The wheel frame is connected to the brake disc through a frame retaining screw. The wheel frame comprises a wheel screw to mount a wheel. The jogger's bar of the brake fluid cylinder moves forward during a flow of the brake fluid into the brake fluid cylinder. The jogger's bar pushes the primary ball bearing in a forward direction resulting in forward motion of the lining rotating disc. The forward motion of the lining rotating pushes the rotating gear toward the intermediate gear. The rotating gear slides through the convergence of the inner and outer sliding environment installed on the lining rotating disc and the rotating gear respectively. The forward movement of the lining rotating disc result in a contact of the brake lining with the brake disc to generate heat resulting into an instantaneous braking action.

According to one embodiment herein, the brake assembly further comprises a rotating shaft, a brake fluid inlet, a brake fluid canal, a brake fluid transmit cylinder, a brake fluid transmitter tube, a brake lining, a rotating gear, a second retainer shaft, an intermediate gear and a brake disc. The rotating shaft is mounted over the retainer main shaft through a ball bearing. One end of the rotating shaft is held by a conjunction of a ball-bearing and a key. The rotating shaft is hollow in nature. The brake fluid inlet is connected to the rotating shaft through a brake fluid transmission frame. The brake fluid transmission frame is connected to the retainer chassis through an attachment screw. The brake fluid canal formed in the hollow space of the rotating shaft. A first end of the brake fluid canal is connected to the brake fluid transmission frame. The brake fluid transmit cylinder houses a second end of the brake fluid canal. The brake fluid transmit cylinder is sealed through an oil seal. The brake fluid transmitter tube is inserted into the brake fluid canal. The brake fluid transmitter tube is housed by a chassis. The brake lining is connected to the chassis and the brake fluid transmitter tube through a brake cylinder. The rotating gear is mounted over the retainer main shaft adjacent to the rotating shaft. The rotating gear has a sliding outer environment. The second retainer shaft is perpendicularly mounted over the retainer main shaft adjacent to the rotating shaft. The intermediate gear is perpendicularly mounted over the second retainer shaft through a ball bearing. The brake disc is attached to the retainer main shaft. The brake disc is further attached to a wheel frame through an attachment screw. The rotating main shaft is shifted forward during a fluid flow through the fluid cylinder. The rotating gear is also shifted forward due to an interaction of the outer shifting environment of the rotating gear with an inner shifting environment of the chassis. The fluid flow to the fluid cylinder via the brake fluid canal and the brake fluid transmitter tube results in a contact of the brake lining with the brake disc. The contact of the brake lining with the brake disc results in generation of heat leading to an instantaneous braking action.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The other objects, features and advantages will occur to those skilled in the art from the following description of the preferred embodiment and the accompanying drawings in which:

FIG. 5A illustrates a sectional view of the braking system with a sliding brake along with a moving brake cylinder and a placement of an intermediate gear for a reverse movement of the brake lining against the brake disc, according to an embodiment herein.

FIGS. 5B and 5C illustrates a front view of the rotating shaft and the sliding outer environment respectively, according to one embodiment herein.

DETAILED DESCRIPTION OF THE DRAWINGS

In the following detailed description, a reference is made to the accompanying drawings that form a part hereof, and in which the specific embodiments that may be practiced is shown by way of illustration. The embodiments are described in sufficient detail to enable those skilled in the art to practice the embodiments and it is to be understood that the logical, mechanical and other changes may be made without departing from the scope of the embodiments. The following detailed description is therefore not to be taken in a limiting sense.

Figure 1A:
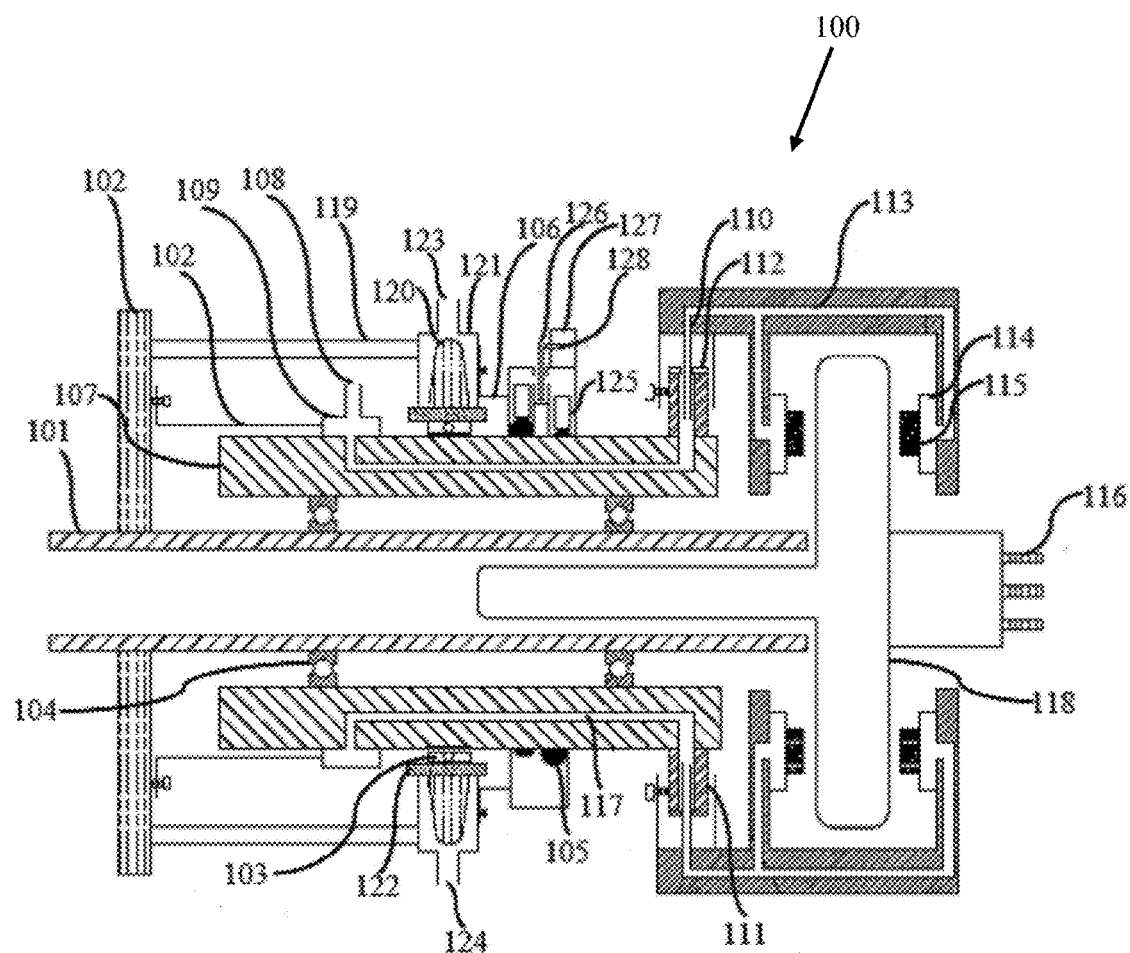
FIG. 1A illustrates a sectional view of the braking system with fixed brake and turbine assembly, according to an embodiment herein.

FIG. 1A illustrates a sectional view of the braking system with fixed brake and turbine assembly, according to an embodiment herein. With respect to FIG. 1, a braking system 100 comprises a retainer main shaft 101, a retainer chassis 102, a brake assembly, a turbine assembly, a locker assembly and a buffer 103. The retainer main shaft 101 is provided in the vehicle for power transfer from the engine onto the wheels. The retainer chassis 102 is perpendicularly connected to the retainer main shaft 101 and provides a rigid support to the retainer main shaft 101. The brake assembly is connected to the retainer main shaft 101 through a plurality of ball bearings 104. The turbine assembly is mounted over the brake assembly. The locker assembly is connected to the brake assembly through a plurality of cams 105. The locker assembly is further connected to the turbine assembly through a locker base 106. The buffer 103 is connected between the brake assembly and the turbine assembly to avoid and redistribute an excess pressure exerted on the turbine assembly due to a movement of the brake assembly. The buffer 103 performs clutching function between the rotating shaft and the turbine assembly.

Figure 1B:
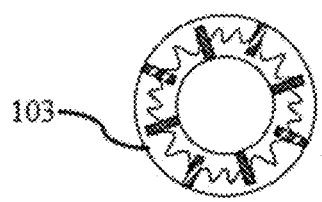
FIG. 1B illustrates top view of a buffer 103 implemented in the braking system of FIG. 1A, according to one embodiment herein.

FIG. 1B illustrates top view of the buffer 103 implemented in the braking system of FIG. 1A, according to one embodiment of the present invention.

The brake assembly comprises a rotating shaft 107, a brake fluid inlet 108, a frame 109, a brake fluid transmitter tube 110, a brake fluid transmit cylinder 111, an oil seal 112, a brake fluid canal 113, a brake cylinder 114, a brake lining 115 and a wheel installation 116. The rotating shaft 107 is connected to the brake assembly through the plurality of ball bearings. The rotating shaft 107 is hollow in nature to form a canal 117. The brake fluid inlet 108 is connected to the canal 117 in the rotating shaft 107. The frame 109 conjuncts the brake fluid inlet 108 to the rotating shaft 107. The brake fluid transmitter tube 110 is inserted into the canal 117 at one end. The brake fluid transmit cylinder 111 forms a housing around a transfer junction formed by insertion of the brake fluid transmitter tube 110 into the canal 117. The oil seal 112 is connected to an end of the brake fluid transmit cylinder 111. The brake fluid transmit cylinder 111 and the oil seal 112 prevents an oil leakage during a brake fluid transfer from the canal 117 to the brake fluid transmitter tube 110. The brake fluid canal 117 is connected to a first end of the brake fluid transmitter tube 110. The brake cylinder 114 is connected to a second end of the brake fluid transmitter tube 110. The brake lining 115 is connected to the brake cylinder 114 from one end and to a brake disc 118 from another end. The brake disc 118 is connected to the wheel installation 116 and housed in the retainer main shaft 107.

The turbine assembly comprises a turbine base 119, a turbine fan 120 and a turbine guard 121. A first end of the turbine base 119 is attached to the retainer chassis 102. The turbine fan 120 is connected to a turbine shaft 122. The turbine shaft 122 is hollow in nature and encompasses the rotating shaft 107. The turbine guard 121 is connected to a second end of the turbine base 119. The turbine guard 121 houses the turbine fan 120 and allows a turbine fluid or air flow through a turbine inlet 123 and a turbine outlet 124.

The locker assembly comprises a plurality of locker piston 125, a coupling valve 126 and an electrical piece 127. The locker pistons 125 are pushed or released through a movement of the cam 105. The cam 105 pushes the locker piston 125 in a radial direction to allow a transfer of the brake fluid from one locker cylinder to another locker cylinder. The coupling valve 126 is attached to the locker cylinders. The electrical piece 127 is connected to the coupling valve 128 through an electrical piece shaft 128. The electrical piece 127 controls an opening or closing of the coupling valve 126. The electrical piece 127 closes the coupling valve 126 to avoid a fluid transfer resulting in locking a motion of the rotating shaft 107 in a direction of movement of the brake disc 118.

According to embodiment herein, the brake fluid flows from the master cylinder to the brake fluid canal provided in the rotating shaft through the brake fluid inlet. The brake fluid is then passed to the brake cylinder through the brake fluid transmit tube. The filling of the brake fluid into the brake cylinder results in a movement of the brake lining towards the brake disc. The brake lining exerts a force on the brake disc to generate heat for stopping the vehicle. Due to friction force exerted during the contact of the brake lining with the brake disc, the brake lining tends to move in the direction of the rotation of the brake disc which is further moving in a direction of motion of the vehicle wheel. The locker assembly blocks a rotation of the rotating shaft and hence the brake lining in a direction of the rotation of the brake disc resulting in a high heat generation. The high heat generation results in high braking efficiency and an instantaneous braking effect.

Figure 2A:
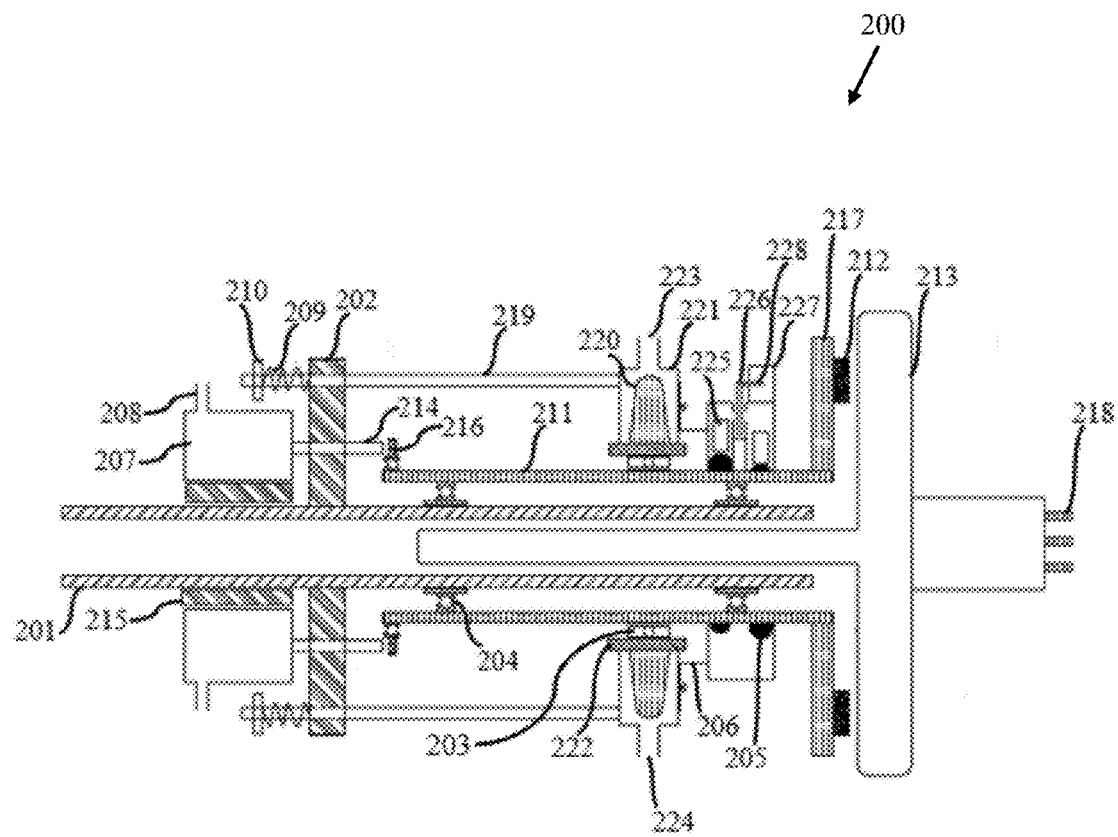
FIG. 2A illustrates a sectional view of the braking system with fixed brake assembly but sliding turbine assembly, according to one embodiment herein.

FIG. 2A illustrates a sectional view of the braking system with fixed brake assembly but sliding turbine assembly, according to one embodiment herein. With respect to FIG. 2, a braking system 200 comprises a retainer main shaft 201, a retainer chassis 202, a brake assembly, a turbine assembly, a locker assembly and a buffer 203. The retainer main shaft 201 is provided in the vehicle for power transfer from the engine onto the wheels. The retainer chassis 202 is perpendicularly connected to the retainer main shaft 201 and provides a rigid support to the retainer main shaft 201. The brake assembly is connected to the retainer main shaft 201 through a plurality of ball bearings 204. The turbine assembly is mounted over the brake assembly. The locker assembly is connected to the brake assembly through a plurality of cams 205. The locker assembly is further connected to the turbine assembly through a locker base 206. The buffer 203 is connected between the brake assembly and the turbine assembly to avoid and redistribute an excess pressure exerted on the turbine assembly due to a movement of the brake assembly. The buffer 203 performs clutching function between the rotating shaft and the turbine assembly.

The brake assembly further comprises a brake fluid cylinder 207, a brake fluid inlet 208, a spring 209, a spring retainer pin 210, a rotating shaft 211, a brake lining 212 and a brake disc 213. The brake fluid cylinder 207 is connected to the retainer chassis 202 though a jogger's bar 214. The brake fluid cylinder 207 holds the brake fluid. The brake fluid cylinder 207 is further connected to the retainer main shaft 201 through a brake cylinder chassis 215. The brake fluid inlet 208 is provided over the brake fluid cylinder 207. The brake fluid inlet 208 allows a brake fluid flow from a master cylinder provided in the vehicle to the brake fluid cylinder 208. The spring 209 is connected to the turbine assembly through a turbine base 210. The retainer chassis 202 forms a barrier at a first end of the spring 209. The spring retainer pin 210 holds the spring 209 to a uniform position by forming a barrier at a second side of the spring 209. The rotating shaft 211 is connected to the retainer main shaft 201 through a primary ball bearing 215. The rotating shaft 211 is further connected to the turbine assembly through a secondary ball bearing 216. The primary ball bearing 215 performs a to and fro motion through a bush provided on the retainer main shaft 201. The brake lining 212 is connected to the rotating shaft 201 through a lining chassis 217. The brake disc 213 is connected to the wheel through a wheel installation 218. The brake fluid cylinder 208 is fixed and the turbine moves to and fro through the secondary ball bearing 216 over the rotating shaft 211. The jogger's bar 214 of the brake fluid cylinder 208 moves forward during a flow of the brake fluid into the brake fluid cylinder 208. The jogger's bar 214 pushes the secondary ball bearing 216 resulting in a forward movement of the rotating shaft 211. The forward movement of the rotating shaft 211 provides a placement of the brake lining 212 over the brake disc 213 to create a friction resulting in a generation of heat. The generation of heat results into an instantaneous braking.

The turbine assembly comprises a turbine base 219, a turbine fan 220 and a turbine guard 221. A first end of the turbine base 219 is attached to the retainer chassis 202. The turbine fan 220 is connected to a turbine shaft 222. The turbine shaft 222 is hollow in nature and encompasses the rotating shaft 211. The turbine guard 221 is connected to a second end of the turbine base 219. The turbine guard 221 houses the turbine fan 220 and allows a turbine fluid or air flow through a turbine inlet 223 and a turbine outlet 224.

The locker assembly comprises a plurality of locker piston 225, a coupling valve 226 and an electrical piece 227. The locker pistons 225 are pushed or released through a movement of the cam 205. The cam 205 pushes the locker piston 225 in a radial direction to allow a transfer of the brake fluid from one locker cylinder to another locker cylinder. The coupling valve 226 is attached to the locker cylinders. The electrical piece 227 is connected to the coupling valve 226 through an electrical piece shaft 228. The electrical piece 227 controls an opening or closing of the coupling valve 226. The electrical piece 227 closes the coupling valve 226 to avoid a fluid transfer resulting in locking a motion of the rotating shaft 211 in a direction of movement of the brake disc 213.

According to one embodiment herein, the brake cylinders are fixed in this plan and are not rotated with turbine assembly. The turbine assembly moves forward due to a sliding movement of the rotating shaft. The Jogger's bar of the brake cylinders pushes the ball bearing attached to the rotating shaft for pushing the brake assembly along with the turbine assembly forward in such a way that the brake linings come in a frictional contact with brake disc.

Figure 2B:
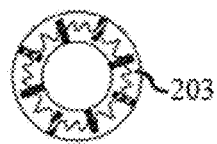
FIG. 2B illustrates a top view of the buffer 203 implemented in the braking system of FIG. 2A, according to one embodiment herein.

FIG. 2B illustrates a top view of the buffer 203 implemented in the braking system of FIG. 2A, according to one embodiment herein.

Figure 3A:
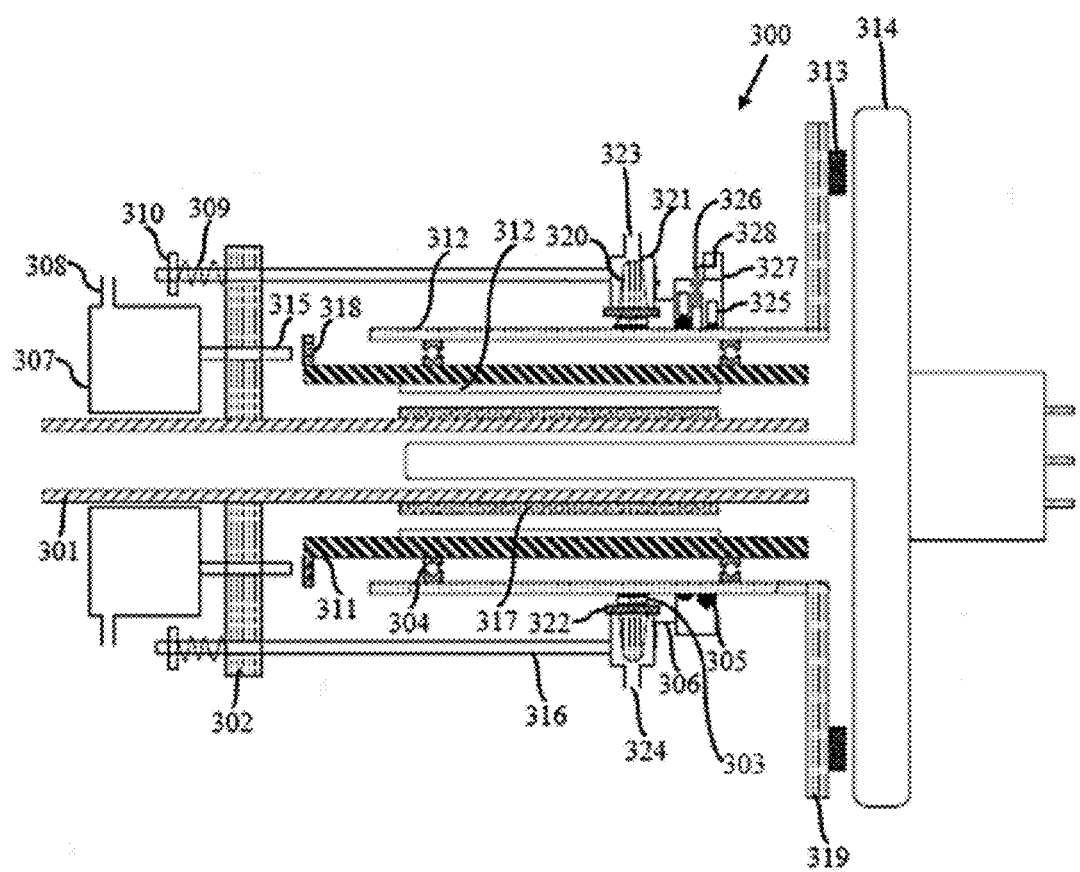
FIG. 3A illustrates a sectional view of the braking system with sliding brake and turbine assembly, according to an embodiment herein.

FIG. 3A illustrates a sectional view of the braking system with sliding brake and turbine assembly, according to an embodiment herein. With respect to FIG. 3, a braking system 300 comprises a retainer main shaft 301, a retainer chassis 302, a brake assembly, a turbine assembly, a locker assembly and a buffer 303. The retainer main shaft 301 is provided in the vehicle for power transfer from the engine onto the wheels. The retainer chassis 302 is perpendicularly connected to the retainer main shaft 301 and provides a rigid support to the retainer main shaft 301. The brake assembly is connected to the retainer main shaft 301 through a plurality of ball bearings 304. The turbine assembly is mounted over the brake assembly. The locker assembly is connected to the brake assembly through a plurality of cams 305. The locker assembly is further connected to the turbine assembly through a locker base 306. The buffer 303 is connected between the brake assembly and the turbine assembly to avoid and redistribute an excess pressure exerted on the turbine assembly due to a movement of the brake assembly. The buffer 303 performing clutching function between the rotating shaft and the turbine assembly.

The brake assembly further comprises a brake fluid cylinder 307, a brake fluid inlet 308, a spring 309, a spring retainer pin 310, an intermediate shaft 311, a rotating shaft 312, a brake lining 313 and a brake disc 314. The brake fluid cylinder 307 is connected to the retainer chassis though a jogger's bar 315. The brake fluid cylinder 307 holds the brake fluid. The brake fluid cylinder 307 is further connected to the retainer main shaft 301 through a brake cylinder chassis. The brake fluid inlet 308 is provided over the brake fluid cylinder 307. The brake fluid inlet 308 allows a brake fluid flow from a master cylinder provided in the vehicle to the brake fluid cylinder 307. The spring 309 is connected to the turbine assembly through a turbine base 316. The retainer chassis 302 forms a barrier from a first end of the spring 309. The spring retainer pin 310 holds the spring 309 to it position by forming a barrier form a second side of the spring 309. The intermediate shaft 311 is connected fixed over the retainer main shaft 301 through an inner sliding base 317. The intermediate shaft 311 comprises a vertical bar 318 and a fixed ball bearing. The rotating shaft 312 is connected to the intermediate shaft 311 through the fixed ball bearings. The rotating shaft 312 further holds the turbine assembly. The brake lining 313 is connected to the intermediate shaft 311 through a lining chassis 319. The brake disc 314 is connected to the wheel through a wheel installation 315. An outer plate of the retainer main shaft 301 slides with the inner sliding base 317. The jogger's bar 315 of the brake fluid cylinder 307 moves forward during a flow of the brake fluid into the brake fluid cylinder 307. The jogger's bar 315 pushes the vertical bar 318 resulting in a forward movement of the intermediate shaft 311 and the rotating shaft 312. The forward movement of the rotating shaft 312 provides a placement of the brake lining 313 over the brake disc 314 to create friction resulting generation of heat. The generation of heat results into an instantaneous braking.

The turbine assembly comprises a turbine base 316, a turbine fan 320 and a turbine guard 321. A first end of the turbine base 316 is attached to the retainer chassis 302. The turbine fan 320 is connected to a turbine shaft 322. The turbine shaft 322 is hollow in nature and encompasses the rotating shaft 312. The turbine guard 321 is connected to a second end of the turbine base 316. The turbine guard 321 houses the turbine fan 320 and allows a turbine fluid or air flow through a turbine inlet 323 and a turbine outlet 324.

The locker assembly comprises a plurality of locker piston 325, a coupling valve 326 and an electrical piece 327. The locker pistons 325 are pushed or released through a movement of the cam 305. The cam 305 pushes the locker piston 325 in a radial direction to allow a transfer of the brake fluid from one locker cylinder to another locker cylinder. The coupling valve 326 is attached to the locker cylinders. The electrical piece 327 is connected to the coupling valve 326 through an electrical piece shaft 328. The electrical piece 327 controls an opening or closing of the coupling valve 326. The electrical piece 327 closes the coupling valve 326 to avoid a fluid transfer resulting in locking a motion of the rotating shaft 312 in a direction of movement of the brake disc 314.

Figure 3B:
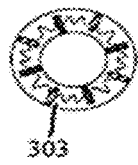
FIG. 3B illustrates a top view of a buffer 303 implemented in the braking system of FIG. 3A, according to one embodiment herein.

FIG. 3B illustrates a top view of a buffer 303 implemented in the braking system of FIG. 3A, according to one embodiment herein.

Figure 3C:
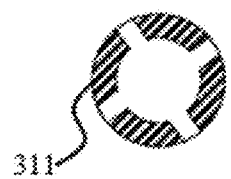
FIGS. 3C and 3D illustrates a front view of the intermediate shaft and the retainer main shaft respectively, according to one embodiment herein.
Figure 3D:
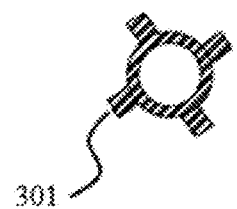

FIGS. 3C and 3D illustrates a front view of the intermediate shaft and the retainer main shaft respectively, according to one embodiment herein.

Figure 4A:
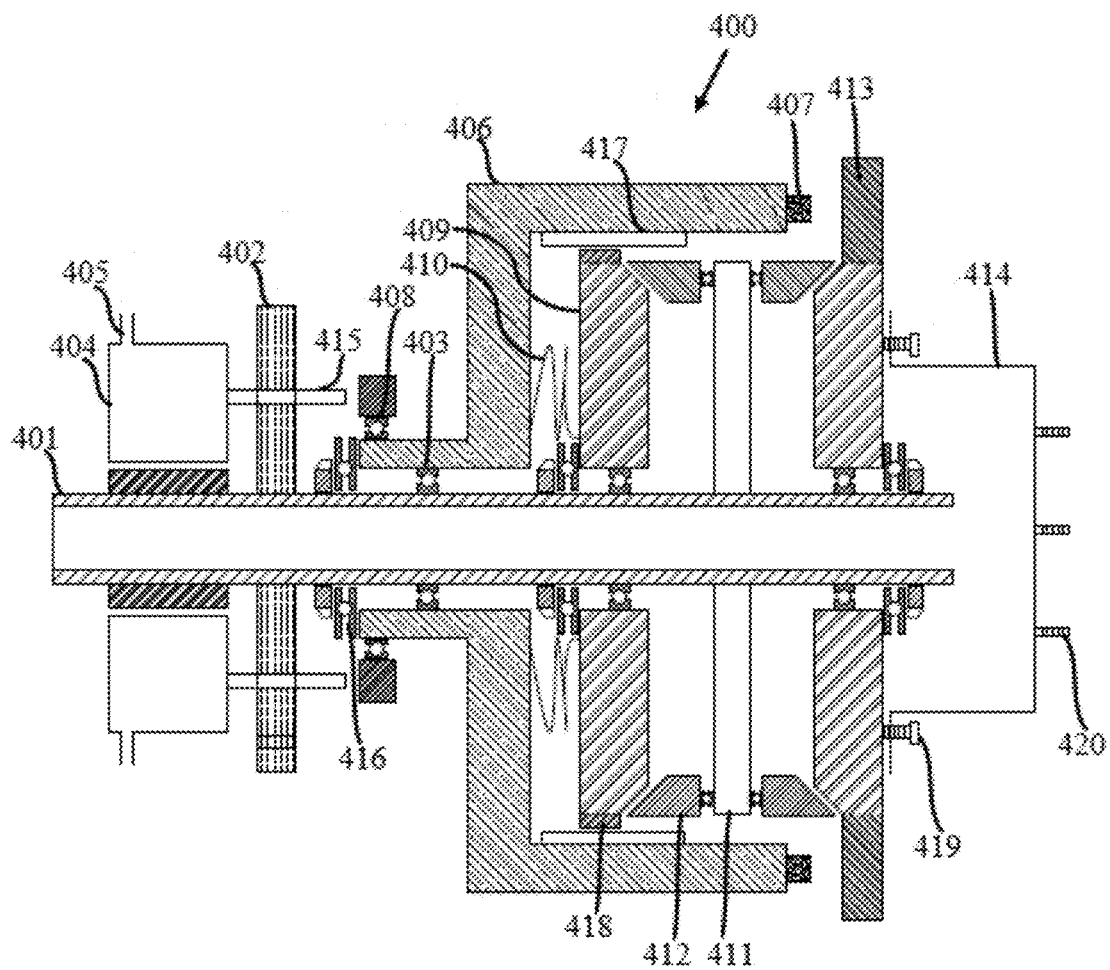
FIG. 4A illustrates a sectional view of the braking system with a sliding brake along with a placement of an intermediate gear for a reverse movement of the brake lining against the brake disc, according to an embodiment herein.

FIG. 4A illustrates a sectional view of the braking system with a sliding brake along with a placement of an intermediate gear for a reverse movement of the brake lining against the brake disc, according to an embodiment herein. With respect to FIG. 4, a braking system 400 comprises a retainer main shaft 401, a retainer chassis 402 and a brake assembly. The retainer main shaft 401 is provided in the vehicle for power transfer from the engine onto the wheels. The retainer chassis 402 is perpendicularly connected to the retainer main shaft 401 and provides a rigid support to the retainer main shaft 401. The brake assembly is connected to the retainer main shaft 401 through a plurality of ball bearings 403.

The brake assembly further comprises a brake fluid cylinder 404, a brake fluid inlet 405, a lining rotating disc 406, a brake lining 407, a primary ball bearing 408, a rotating gear 409, a spring 410, a second retainer shaft 411, an intermediate gear 412, a brake disc 413 and a wheel frame 414. The brake fluid cylinder 404 is connected to the retainer chassis though a jogger's bar 415. The brake fluid cylinder 404 holds the brake fluid. The brake fluid cylinder 404 is further connected to the retainer main shaft 401 through a brake cylinder chassis 415. The brake fluid inlet 405 is provided over the brake fluid cylinder 404. The brake fluid inlet 405 allows a brake fluid flow from a master cylinder provided in the vehicle to the brake fluid cylinder 404. The lining rotating disc 406 is mounted on the retainer main shaft 401 through a secondary ball bearing 416. The lining rotating disc 406 has an inner sliding environment 417. The secondary ball bearing 418 performs a to and fro motion through a bush placed on an outer environment of the retainer main shaft 401. The brake lining 407 is installed at one end of the lining rotating disc 406. The primary ball bearing 408 is mounted on the lining rotating disc 406 in a sliding form and performs a to and fro motion through a bush. The rotating gear 409 is provide on the retainer main shaft 401. The rotating gear 409 has a sliding outer environment 419. The spring 410 is connected between the lining rotating disc 406 and the rotating gear 409. The second retainer shaft 411 is connected to the retainer main shaft 401. The intermediate gear 412 is installed over the second retainer shaft 411. The brake disc 413 is attached axially adjacent to the retainer main shaft 401. The wheel frame 414 is connected to the brake disc 413 through a frame retaining screw 419. The wheel frame 414 comprises a wheel screw 420 to mount a wheel over the brake disc. The jogger's bar 415 of the brake fluid cylinder 404 moves forward during a flow of the brake fluid into the brake fluid cylinder 404. The jogger's bar 415 pushes the primary ball bearing 408 in a forward direction resulting in forward motion of the lining rotating disc 406. The forward motion of the lining rotating disc 406 pushes the rotating gear 409 toward the intermediate gear 412. The rotating gear 409 slides through the convergence of the inner and outer sliding environment installed on the lining rotating disc 406 and the rotating gear 409 respectively. The forward movement of the lining rotating disc 406 result in a contact of the brake lining 407 with the brake disc to generate heat resulting into an instantaneous braking action.

Figures 4B, 4C:
FIG. 4B and FIG. 4C illustrates a front view of the lining rotating disc and the rotating gear, according to one embodiment herein.

FIG. 4B and FIG. 4C illustrates a front view of the lining rotating disc and the rotating gear, according to one embodiment herein.

FIG. 5A illustrates a sectional view of the braking system with a sliding brake and turbine assembly along with a moving brake cylinder and a placement of an intermediate gear for a reverse movement of the brake lining against the brake disc, according to an embodiment herein. With respect to FIG. 5, a braking system 500 comprises a retainer main shaft 501, a retainer chassis 502 and a brake assembly. The retainer main shaft 501 is provided in the vehicle for power transfer from the engine onto the wheels. The retainer chassis 502 is perpendicularly connected to the retainer main shaft 501 and provides a rigid support to the retainer main shaft 501. The brake assembly is connected to the retainer main shaft 501 through a plurality of ball bearings 503.

The brake assembly further comprises a rotating shaft 504, a brake fluid inlet 505, a brake fluid canal 506, a brake fluid transmit cylinder 507, a brake fluid transmitter tube 508, a brake lining 509, a rotating gear 510, a second retainer shaft 511, an intermediate gear 512 and a brake disc 513. The rotating shaft 504 is mounted over the retainer main shaft 501 through a ball bearing. One end of the rotating shaft 504 is held by a conjunction of a ball-bearing 514 and a key 515. The rotating shaft 504 is hollow in nature. The brake fluid inlet 505 is connected to the rotating shaft 504 through a brake fluid transmission frame 516. The brake fluid transmission frame 516 is connected to the retainer chassis 502 through an attachment screw 517. The brake fluid canal 506 formed in the hollow space of the rotating shaft 504. A first end of the brake fluid canal 506 is connected to the brake fluid transmission frame 516. The brake fluid transmit cylinder 507 houses a second end of the brake fluid canal 506. The brake fluid transmit cylinder 507 is sealed through an oil seal 517. The brake fluid transmitter tube 508 is inserted into the brake fluid canal 506. The brake fluid transmitter tube 508 is housed by a chassis 518. The brake lining 509 is connected to the chassis 518 and the brake fluid transmitter tube 508 through a brake cylinder 519. The rotating gear 510 is mounted over the retainer main shaft 501 adjacent to the rotating shaft 504. The rotating gear 510 has a sliding outer environment 520. The second retainer shaft 511 is perpendicularly mounted over the retainer main shaft 501 adjacent to the rotating shaft 504. The intermediate gear 512 is perpendicularly mounted over the second retainer shaft 511 through a ball bearing. The brake disc 513 is attached to the retainer main shaft 501. The brake disc 513 is further attached to a wheel frame 521 through an attachment screw 522. The rotating shaft 504 is shifted forward during a fluid flow through the fluid cylinder. The rotating gear 510 is also shifted forward due to an interaction of the outer shifting environment 520 of the rotating gear 510 with an inner shifting environment 524 of the chassis. The fluid flow to the brake fluid transmit cylinder 507 via the brake fluid canal 506 and the brake fluid transmitter tube 508 results in a contact of the brake lining 509 with the brake disc 513. The contact of the brake lining 509 with the brake disc 513 results in generation of heat leading to an instantaneous braking action.

FIGS. 5B and 5C illustrates a front view of the rotating shaft and the sliding outer environment respectively, according to one embodiment herein.

The present braking system avoids a locking of the brake lining in the direction of a movement of the wheel, thus resulting in higher conversion rate of the force applied by the brake lining into heat. The higher heat generation results in a braking effect within a momentarily small time duration. Also an assembly of the present braking system is least complex in nature, thus allowing low maintenance cost.

It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the claims.

I claim:

1. A braking system with high brake efficiency comprising: a retainer main shaft, wherein the retainer main shaft is a shaft provided in the vehicle for power transfer from an engine onto a wheels; a retainer chassis, wherein the retainer chassis is perpendicularly connected to the retainer main shaft and provides a rigid support to the retainer main shaft; a brake assembly, wherein the brake assembly is connected to the retainer main shaft through a plurality of ball bearings; a turbine assembly, wherein the turbine assembly is mounted over the brake assembly; a locker assembly, wherein the locker assembly is connected to the brake assembly through a plurality of cams, wherein the locker assembly is further connected to the turbine assembly through a locker base; a buffer, wherein the buffer is connected between the rotating shaft and the turbine assembly to avoid and redistribute an excess pressure exerted on the turbine assembly due to a movement of the brake assembly, wherein the buffer performs clutching function between the brake assembly and the turbine assembly.

2. The braking system according to claim 1, wherein the brake assembly comprises: a rotating shaft, wherein the rotating shaft is connected to the brake assembly through the plurality of ball bearings, wherein the rotating shaft is hollow in nature, wherein the hollow portion forms a canal; a brake fluid inlet, wherein the brake fluid inlet is connected to the canal in the rotating shaft; a frame, wherein the frame conjuncts the brake fluid inlet to the rotating shaft; a brake fluid transmitter tube, wherein the brake fluid transmitter tube is inserted into the canal at one end; a brake fluid transmit cylinder, wherein the brake fluid transmit cylinder forms a housing around a transfer junction formed by insertion of the brake fluid transmitter tube into the canal; an oil seal, wherein the oil seal is connected to an end of the brake fluid transmit cylinder, wherein the brake fluid transmit cylinder and the oil seal prevents an oil leakage during a brake fluid transfer from the canal to the brake fluid transmitter tube; a brake fluid canal, wherein the brake fluid canal is connected to a first end of the brake fluid transmitter tube; a brake cylinder, wherein the brake cylinder is connected to a second end of the brake fluid transmitter tube; a brake lining, wherein the brake lining is connected to the brake cylinder from one end and to a brake disc from another end; a wheel installation, wherein the brake disc is connected to the wheel installation, wherein the brake disc is further housed in the retainer main shaft; wherein, the brake lining exerts a force on the brake disc to generate heat for stopping the vehicle, wherein the locker assembly blocks a rotation of the rotating shaft in a direction of the rotation of the brake disc resulting in a high heat generation, wherein the high heat generation results in high braking efficiency and an instantaneous braking effect.

3. The braking system according to claim 1, wherein the brake assembly further comprises: a brake fluid cylinder, wherein the brake fluid cylinder is connected to the retainer chassis though a jogger's bar, wherein the brake fluid cylinder holds the brake fluid, wherein the brake fluid cylinder is further connected to the retainer main shaft through a brake cylinder chassis; a brake fluid inlet, wherein the brake fluid inlet is provided over the brake fluid cylinder, wherein the brake fluid inlet allows a brake fluid flow from a master cylinder provided in the vehicle to the brake fluid cylinder; a spring, wherein the spring is connected to the turbine assembly through the turbine base, wherein the retainer chassis forms a barrier at a first end of the spring; a spring retainer pin, wherein the spring retainer pin holds the spring to it position by forming a barrier at a second side of the spring; a rotating shaft, wherein the rotating shaft is connected to the retainer main shaft through a primary ball bearing, wherein the rotating shaft is further connected to the turbine assembly through a secondary ball bearing assembly, wherein the primary ball bearing performs a to and fro motion through a bush provided on the retainer main shaft; a brake lining, wherein the brake lining is connected to the rotating shaft through a lining chassis; a brake disc, wherein the brake disc is connected to the wheel through a wheel installation; wherein, the brake fluid cylinder is fixed and the turbine moves to and fro through the secondary ball bearing over the rotating shaft, wherein the jogger's bar of the brake fluid cylinder moves forward during a flow of the brake fluid into the brake fluid cylinder, wherein the jogger's bar pushes the secondary ball bearing resulting in a forward movement of the rotating shaft, wherein the forward movement of the rotating shaft provides a placement of the brake lining over the brake disc to create a friction resulting in a generation of heat, wherein the generation of heat results into an instantaneous braking.

4. The braking system according to claim 1, wherein the brake assembly further comprises: a brake fluid cylinder, wherein the brake fluid cylinder is connected to the retainer chassis though a jogger's bar, wherein the brake fluid cylinder holds the brake fluid, wherein the brake fluid cylinder is further connected to the retainer main shaft through a brake cylinder chassis; a brake fluid inlet, wherein the brake fluid inlet is provided over the brake fluid cylinder, wherein the brake fluid inlet allows a brake fluid flow from a master cylinder provided in the vehicle to the brake fluid cylinder; a spring, wherein the spring is connected to the turbine assembly through the turbine base, wherein the retainer chassis forms a barrier from a first end of the spring; a spring retainer pin, wherein the spring retainer pin holds the spring to it position by forming a barrier form a second side of the spring; an intermediate shaft, wherein the intermediate shaft is connected fixed over the retainer main shaft through an inner sliding base, wherein the intermediate shaft comprises a vertical bar and a fixed ball bearing; a rotating shaft, wherein the rotating shaft is connected to the intermediate shaft through the fixed ball bearings, wherein the rotating shaft further holds the turbine assembly; a brake lining, wherein the brake lining is connected to the intermediate shaft through a lining chassis; a brake disc, wherein the brake disc is connected to the wheel through a wheel installation; wherein, an outer plate of the retainer shaft slides with the inner sliding base, wherein the jogger's bar of the brake fluid cylinder moves forward during a flow of the brake fluid into the brake fluid cylinder, wherein the jogger's bar pushes the vertical bar resulting in a forward movement of the intermediate shaft and the rotating shaft, wherein the forward movement of the rotating shaft provides a placement of the brake lining over the brake disc to create friction resulting generation of heat, wherein the generation of heat results into an instantaneous braking.

5. The braking system according to claim 1, wherein the turbine assembly comprises: a turbine base, wherein a first end of the turbine base is attached to the retainer chassis; a turbine fan, wherein the turbine fan is connected to a turbine shaft, wherein the turbine shaft is hollow in nature and encompasses the rotating shaft; a turbine guard, wherein the turbine guard is connected to a second end of the base, wherein the turbine guard houses the turbine fan and comprises a turbine inlet and a turbine outlet.

6. The braking system according to claim 1, wherein the locker assembly comprises; a plurality of locker piston, wherein the locker pistons are pushed or released through a movement of the cam, wherein the cam pushes the locker piston in a vertically upward direction to allow a transfer of the brake fluid from one locker cylinder to another locker cylinder; a coupling valve, wherein the coupling valve is attached to the locker cylinders; an electrical piece, wherein the electrical piece is connected to the coupling valve through an electrical piece shaft, wherein the electrical piece controls an opening or closing of the coupling valve, wherein the electrical piece closes the coupling valve to avoid a fluid transfer resulting in locking a motion of the rotating shaft in a direction of movement of the brake disc.

7. A braking system with high brake efficiency comprising: a retainer main shaft, wherein the retainer main shaft is provided in the vehicle for power transfer from the engine onto the wheels; a retainer chassis, wherein the retainer chassis is perpendicularly connected to the retainer main shaft and provides a rigid support to the retainer main shaft; a brake assembly, wherein the brake assembly is connected to the retainer main shaft through a plurality of ball bearings, wherein the brake assembly further comprises: a brake fluid cylinder, wherein the brake fluid cylinder is connected to the retainer chassis though a jogger's bar, wherein the brake fluid cylinder holds the brake fluid, wherein the brake fluid cylinder is further connected to the retainer main shaft through a brake cylinder chassis; a brake fluid inlet, wherein the brake fluid inlet is provided over the brake fluid cylinder, wherein the brake fluid inlet allows a brake fluid flow from a master cylinder provided in the vehicle to the brake fluid cylinder; a lining rotating disc, wherein the lining rotating disc is mounted on the retainer main shaft through a secondary ball bearing, wherein the lining rotating disc has an inner sliding environment, wherein the secondary ball bearing performs a to and fro motion through a bush placed on an outer environment of the retainer main shaft; a brake lining, wherein the brake lining is installed at one end of the lining rotating disc; a primary ball bearing, wherein the primary ball bearing is mounted on the lining rotating disc in a sliding form and performs a to and fro motion through a bush provided on the lining rotating chassis; a rotating gear, wherein the rotating gear is provide on the retainer main shaft, wherein the rotating gear has a sliding outer environment; a spring, wherein the spring is connected between the lining rotating disc and the rotating gear; a second retainer shaft, wherein the second retainer shaft is connected to the retainer main shaft; an intermediate gear, wherein the intermediate gear is installed over the second retainer shaft; a brake disc, wherein the brake disc is attached axially adjacent to the retained main shaft; a wheel frame, wherein the wheel frame is connected to the brake disc through a frame retaining screw, wherein the wheel frame comprises a wheel screw to mount a wheel; wherein, the jogger's bar of the brake fluid cylinder moves forward during a flow of the brake fluid into the brake fluid cylinder, wherein the jogger's bar pushes the primary ball bearing in a forward direction resulting in forward motion of the lining rotating disc, wherein the forward motion of the lining rotating pushes the rotating gear toward the intermediate gear, wherein the rotating gear slides through the convergence of the inner and outer sliding environment installed on the lining rotating disc and the rotating gear respectively, wherein the forward movement of the lining rotating disc result in a contact of the brake lining with the brake disc to generate heat resulting into an instantaneous braking action.

8. The braking system according to claim 7, wherein the brake assembly further comprises: a rotating shaft, wherein the rotating shaft is mounted over the retainer main shaft through a ball bearing, wherein one end of the rotating shaft is held by a conjunction of a ball-bearing and a key, wherein the rotating shaft is hollow in nature; a brake fluid inlet, wherein the brake fluid inlet is connected to the rotating shaft through a brake fluid transmission frame, wherein the brake fluid transmission frame is connected to the retainer chassis through an attachment screw; a brake fluid canal, wherein the brake fluid canal formed in the hollow space of the rotating shaft, wherein a first end of the brake fluid canal is connected to the brake fluid transmission frame; a brake fluid transmit cylinder, wherein the brake fluid transmit cylinder houses a second end of the brake fluid canal, wherein the brake fluid transmit cylinder is sealed through an oil seal; a brake fluid transmitter tube, wherein the brake fluid transmitter tube is inserted into the brake fluid canal, wherein the brake fluid transmitter tube is housed by a chassis; a brake lining, wherein the brake lining is connected to the chassis and the brake fluid transmitter tube through a brake cylinder; a rotating gear, wherein the rotating gear is mounted over the retainer main shaft adjacent to the rotating shaft, wherein the rotating gear has a sliding outer environment; a second retainer shaft, wherein the second retainer shaft is perpendicularly mounted over the retainer main shaft adjacent to the rotating shaft; an intermediate gear, wherein the intermediate gear is perpendicularly mounted over the second retainer shaft through a ball bearing; a brake disc, wherein the brake disc is attached to the retainer main shaft, wherein the brake disc is further attached to a wheel frame through an attachment screw; wherein, the rotating main shaft is shifted forward during a fluid flow through the fluid cylinder, wherein the rotating gear is also shifted forward due to an interaction of the outer shifting environment of the rotating gear with an inner shifting environment of the chassis, wherein the fluid flow to the fluid cylinder via the brake fluid canal and the brake fluid transmitter tube results in a contact of the brake lining with the brake disc, wherein the contact of the brake lining with the brake disc results in generation of heat leading to an instantaneous braking action.

* * * * *